United States Patent Office 3,685,964
Patented Aug. 22, 1972

3,685,964
PURIFICATION OF ALKALI PHOSPHATE
SOLUTION
Theodore Leo Treitler, Millburn, N.J., assignor to FMC
Corporation, New York, N.Y.
No Drawing. Continuation of abandoned application Ser.
No. 733,267, May 31, 1968. This application Dec. 9,
1970, Ser. No. 96,592
Int. Cl. C01b 25/30
U.S. Cl. 427—158                  9 Claims

ABSTRACT OF THE DISCLOSURE

A method is provided for purifying aqueous alkali phosphate solutions produced from wet-process phosphoric acid and containing less than 10,000 p.p.m., usually 50–1,000 p.p.m., of iron by treating them with alkali sulfides or hydrogen sulfide at pH 6.5 to 9 to remove undesirable metal ions, particularly iron.

CROSS REFERENCE TO RELATED APPLICATIONS

This application is a continuation of U.S. application Ser. No. 733,267, filed May 31, 1968 entitled "Purification of Alkali Phosphate Solution" and was filed before the patenting or abandonment of or termination of proceedings of the parent application.

BACKGROUND OF THE INVENTION

(A) Field of the invention

The present invention relates to the purification of aqueous alkali phosphate solutions containing iron (expressed herein on the basis of iron ions), and derived from phosphoric acids obtained by the acidulation of phosphate ores with mineral acids, to provide essentially iron-free alkali phosphate.

(B) Description of the prior art

Alkali phosphates are prepared commercially by reacting alkaline compounds such as sodium carbonate with phosphoric acid in an aqueous solution. The phosphoric acid used may be produced by the elemental-phosphorus-based process or the wet-process. The former involves burning molten phosphorus in a suitable reactor and then hydrating the resulting $P_2O_5$ to form the desired acid solution; the wet-process consists of reacting phosphate rock normally containing phosphorus in the form of $Ca_{10}F_2(PO_4)_6$ with any mineral acid, e.g. sulfuric acid, hydrochloric acid, nitric acid, hydrofluoric acid and the like. The resultant acid product is termed "green acid."

Alkali phosphates derived from the cheaper wet-process acid have as a major drawback in comparison with those derived from elemental-phosphorus-based acid, the presence of numerous impurities in substantial amounts, mainly, iron, aluminum, vanadium, arsenic, calcium and magnesium as well as other organic and inorganic impurities. These impurities may be tolerated for alkali phosphate applications not requiring high purity such as solid fertilizer use and the like. But for the technical grades of alkali phosphates used for detergent formulations, liquid fertilizer, water treatment, in the manufacture of dyes and pigments, and the like, the removal of these impurities, especially the metal impurities and particularly iron, is necessary.

For example, in detergent formulations iron has an adverse effect by reducing the efficiency of a detergent. Iron reacts with anionic detergent groups forming insoluble compounds, which together with iron oxides dull white and colored fabrics. Furthermore, it eliminates the anionic detergent groups which would otherwise be available to link with deleterious calcium cations. For these reasons, alkali phosphates of detergent grade quality should contain about 50 p.p.m. or less of iron impurities.

Wet-process phosphoric acid can be partially purified by precipitation, hydrofluoric acid coprecipitation, ion exchange neutralization, crystallization or solvent extraction but none of these processes can produce economically an acid pure enough for detergent and similar uses.

Processes have also been devised for removal of impurities other than iron from phosphoric acid, e.g. hydrogen sulfide has been used to remove arsenic from neutralized solutions of phosphoric acid at a pH ranging from 2 to 5 during the removal of bulk impurities at an early stage of acid purification, as reported in Van Wazen, J. R., "Phosphorus and Its Compounds" vol. II, page 1052 (1961).

However, it has generally been found that such processes, including the process used for arsenic removal, have not been effective in removing iron impurities to provide the low iron content required for detergent and other high quality uses of phosphoric acid and alkali phosphates, e.g. less than 50 p.p.m.

OBJECTS OF THE INVENTION

It is an object of this invention to provide a new and novel method for economically producing wet-process phosphoric acid-derived, concentrated alkali phosphates substantially free of interfering and contaminating metal ions, particularly iron.

It is a further object of this invention to provide a method for reducing the iron content of concentrated alkali phosphate solutions to the low level required for detergent products without concomitant loss of $P_2O_5$ values and without undue expense.

Other objects and advantages will become apparent from the detailed description presented herein.

SUMMARY OF THE INVENTION

I have now found a simple, economical process which reduces to a low level (below about 50 p.p.m.) the iron content of an aqueous alkali phosphate solution which was produced from wet-process acid and partially purified by any of the heretofore practiced purification methods mentioned above to provide an alkali phosphate containing less than 10,000 p.p.m., and preferably between about 50–1,000 p.p.m., of iron on a 75% phosphoric acid ($H_3PO_4$) basis. My process involves contacting the partially purified alkali phosphate with hydrogen sulfide or an alkali sulfide, preferably ammonium sulfide, sodium sulfide, potassium sulfide, barium sulfide, or other soluble complex sulfides capable of generating sulfide ion in solution in aqueous solution at a pH of 6.5 to 9. This treatment produces insoluble iron sulfide and other metal sulfides which are easily removed. The iron content of the alkali phosphate after treatment by my process is low enough to make it suitable for use in detergent formulations, i.e. below 50 p.p.m. on the aforementioned 75% $H_3PO_4$ basis. This purification process is highly effective in the difficult removal of undesirable low-level iron impurities, and it may be performed in a most economical manner with only slight modifications to existing operating equipment.

DESCRIPTION OF THE INVENTION AND THE PREFERRED EMBODIMENTS

In carrying out the process of my invention and aqueous alkali phosphate produced from partially purified wet-process phosphoric acid, is treated with an alkali sulfide or hydrogen sulfide at the specified condition of pH to remove essentially all of the iron and a substantial amount of the other metal impurities dissolved or colloidally suspended in the phosphate solution. The mechanism of this reaction is believed to involve reduction of the iron to the ferrous state, producing a ferrous sulfide precipitate, although the correctness of this theory is not critical to operability of my process.

Aqueous alkali phosphate solutions containing 10–30% $P_2O_5$, but preferably having a concentration of 20–25% $P_2O_5$, and which have been partially purified to reduce their iron contents to less than 10,000 p.p.m., but preferably between 50–1,000 p.p.m. of iron, are treated effectively and economically according to the process of my invention. It is most desirable for economic reasons to operate the process at iron concentrations below about 1,000 p.p.m. of iron, although as noted presence of iron in amounts up to about 10,000 p.p.m. is practicable.

The sulfides which are particularly useful in carrying out the herein purification process are hydrogen sulfide and the alkali sulfides, particularly but not exclusively ammonium sulfide, barium sulfide, sodium sulfide and potassium sulfide. Other alkali and alkaline earth sulfides, e.g. calcium sulfide and magnesium sulfide may be used. These additional sulfides introduce cations to the phosphate which for some uses are objectionable, and their use is therefore not normally preferred. However, since they do function to remove iron from alkali phosphate solutions, their use is within the scope of this invention. The term "alkali" as used in this disclosure refers to any of the alkali metals and alkaline earth metals with sodium and potassium being the preferred embodiments.

Hydrogen sulfide is introduced by bubbling the gas through partially purified aqueous alkali phosphate solution. The alkali sulfides may be added more conveniently as solids or as aqueous solutions.

Addition of the sulfide causes iron sulfide to precipitate, and the precipitate is removed by filtration, centrifugation, or the like. In addition to the iron, other metallic impurities form insoluble sulfides and it is an advantage of this invention that such other insoluble sulfides are also extracted from the impure alkali phosphate solution by the present process.

At least a stoichiometric amount of sulfide is required to remove the iron and other metal impurities to the level desired, but obviously less than the stoichiometric amount may be used where it is intended to remove less iron and other metal impurities. Generally, about 500 to 6,000 p.p.m., and preferably about 1,000 p.p.m., of sulfide is sufficient but this will vary depending on the pH and the amount of iron and other metal ions intended to be removed. The use of an excess is not generally harmful although for economic reasons more sulfide than required is not used.

A more efficient use of the sulfide reagent occurs if the crude alkali phosphate solution is pretreated with activated charcoal to remove any organic matter which would react with the sulfide.

I have found that the pH is critical and must be above about 6.5, with best results obtained at a pH of about 6.5 to 9, and preferably of about 7. Operation at a pH below about 6.5 is not effective enough to provide an alkali phosphate useful in detergent applications. While at a pH above about 9 iron is removed, generally speaking there is no need to raise the pH to those levels.

Normally the process is conducted at atmospheric pressure, but at lower pH levels within any range of 6.5 to 9 and higher temperatures, pressures of about 2 atmospheres may be necessary to provide the desired sulfide concentration in the solution. Therefore, a closed system is preferred.

The hydrogen sulfide or alkali sulfide treatment of alkali phosphate preferably is carried out at temperatures of about 50–70° C., but lower or higher temperatures may be used without adverse effect. The reaction is rapid, taking place in a matter of a few seconds, but a residence time of 1–3 hours allows the precipitate to grow to a size that is quite readily filterable. Also, the addition of filter aids such as Celite, which is a diatomaceous silica, to the suspension allows more thorough filtration of the iron sulfide which tends to precipitate in a partially colloidal form.

In a preferred embodiment, this invention comprises partially purifying a phosphoric acid obtained by acidulating a phosphate ore with sulfuric acid, by the solvent extraction process described in copending application S.N. 554,563, filed June 1, 1966 in the name of Donald S. Bunin et al., followed by reacting the resulting partially purified alkali phosphate with aqueous sodium hydroxide. Next the solution is treated with an activated charcoal to remove organic matter. The sodium phosphate solution so produced is still relatively high in iron content, e.g. approximately 50 to 1,000 p.p.m. of iron. The following step involves closing the system or transferring the solution to a closed system. Hydrogen sulfide is then added and the system agitated upon which a black ferrous sulfide precipitate forms, and the precipitate is removed by filtration. After removal of the precipitate the purified sodium phosphate is vented to remove any excess hydrogen sulfide.

Reference is made throughout the specification to the partially purified aqueous alkali phosphate solution which is treated by the process of this invention. Crude wet-process phosphoric acid can be partially purified by any means, including precipitation, hydrofluoric acid coprecipitation, ion exchange neutralization, crystallization, or solvent extraction. These processes are described briefly as follows.

Precipitation is the conventional method for removing cationic impurities from wet-process acid. The pH of green acid (wet-process acid) is raised with a basic reagent (e.g. sodium carbonate, calcium oxide, calcium carbonate, etc.) until these imprities have been precipitated. In this process the precipitated iron impurities, ranging in composition from $FePO_4$ to $Fe_3PO_4.3H_3PO_4$, may tie up as much as 13–20% of the $P_2O_5$ originally in the acid; only a portion of this tied up $P_2O_5$ which is recoverable by hydrolysis.

A more efficient method of precipitation is taught in U.S. Pat. No. 3,379,501 to Treitler et al., which involves adjusting the calcium ion level and adding hydrofluoric acid to coprecipitate the iron, aluminum and magnesium impurities along with calcium fluoride.

These treatments both remove about 90% of the iron impurities from the wet-process acid. However, it is very difficult to reduce the iron to the concentration at which it can be tolerated for detergent uses (about 50 p.p.m. or less) since operational costs become prohibitive and the efficiency of these processes decreases at these low levels.

Ion exchange processes utilize both anionic and cationic exchange compounds to remove metallic impurities from wet-process phosphoric acid. Most of the metal impurities are adsorbed by cationic compounds but some are also adsorbed by anionic compounds since some of the metals, e.g. iron and aluminum, form anionic complexes. High purity alkali phosphates have been derived from wet-process phosphoric acid purified by ion exchange techniques, however, these involve multi-stage systems involving high chemical cost.

Crystallization involves removing water from the wet-process acid at low temperature and pressure, in fixing the concentrated solution with a seed crystal and then centrifuging to separate the product crystals from the mother liquor.

Solvent extraction procedures involve treatment of the crude wet-process acid with any of a variety of solvents for the acid (e.g., alcohols and oxygenated hydrocarbons), followed by an extraction step to remove substantial amounts of impurities. This process is also useful economically to reduce iron contents of green acid to below 10,000 p.p.m., to provide partially purified acid for use as a starting material in the process of this invention.

A preferred solvent extraction method is proposed in above-mentioned S.N. 554,563. Bunin et al. purify crude phosphoric acid produced by the wet-acid process using sulfuric acid as the acidulant. A sodium salt and a calcium salt which are soluble in the acid are added to the crude acid to precipitate calcium sulfate and sodium fluosilicate. The precipitate is separated from the crude acid and an organic extraction solution, which is substantially water insoluble, is added to the remaining acid to improve phase separation. The organic extraction solution is made up of either an alkyl phosphate, an aryl phosphate or an alkyl-aryl phosphate diluted with an organic solvent, such as aromatic and aliphatic hydrocarbons and chlorinated aromatic hydrocarbons, e.g. benzene, toluene or monochlorobenzene. This is followed by a stripping step which involves treatment with an aqueous phosphoric acid of greater purity than the raffinate, in which a large portion of iron and other cationic impurities are removed.

These various partial purification processes are effective in reducing the iron content of the acid or phosphate, as may apply, to below 10,000 p.p.m., but are not economical when used to purify to the low iron levels required in detergent grade alkali phosphates, that is less than 50 p.p.m. of iron on a 75% $H_3PO_4$ basis.

The following examples will serve to further illustrate the process of the present invention, but are not meant to limit it thereto.

Example 1 (Comparative)

A wet acid derived phosphoric acid containing 30% $P_2O_5$ and 1.3% $Fe_2O_3$ (236,900 p.p.m. Fe on a 75% $H_3PO_4$ basis) having a pH of 1.5 was prepared by the acidulation of phosphate rock with sulfuric acid. A 500 ml. sample of this wet-process phosphoric acid was treated with 5 g. of activated charcoal for 30 minutes at 95° C. The suspension was filtered through Whatman No. 40 paper on a Buchner funnel under moderate vacuum (25 mm. Hg pressure) giving a clear green solution having a phosphate content of 30% expressed as $P_2O_5$.

A portion of this solution was neutralized with 50% aqueous sodium hydroxide solution to a pH of 5.0 with precipitation of impurities. These impurities were removed by filtration (as above) giving a clear filtrate containing 14.6% $P_2O_5$ and 46 p.p.m., or 171 p.p.m. on a 75% $H_3PO_4$ basis, of iron.

In a half-filled open beaker $H_2S$ was bubbled through the clear filtrate at a pH of 5.0, at 25° C. for about 30 minutes. One-half percent Celite filter aid was added to the black iron sulfide precipitate and both were removed by filtration. The residual clear solution contained 14.6% $P_2O_5$ and 26 p.p.m., or 97 p.p.m. on a 75% $H_3PO_4$ basis, of iron, an amount too high for detergent use of the product. Results are shown in the table which follows these examples.

This example illustrates several things. The conventional precipitation method for partially purifying wet-process phosphoric acid by increasing the pH is demonstrated. Furthermore, three things are to be noted as characteristic of this process:

(1) Attempts to remove iron impurity by the neutralization method reduced the $P_2O_5$ value from 30% to 14.6%, (2) There was no loss of $P_2O_5$ values when hydrogen sulfide was used to treat the solution, and (3) The criticality of pH during the sulfide treatment is shown, it being demonstrated that treatment at pH 5-0 was not satisfactory.

In the following examples, samples of crude wet-process phosphoric acid taken from the same batch as that used in Example 1, and having the $P_2O_5$ values and impurities described therein, and identified as Example 1 phosphoric acid, was partially purified by the solvent extraction process of copending Ser. No. 554,563 referred to above. The partial purification was carried out to the extent required to provide the iron contents of the starting materials in the following examples.

Example 2 (Comparative)

A sample of Example 1 phosphoric acid was partially purified by the solvent extraction process referred to above, treated with charcoal and filtered. A portion containing 29.6% $P_2O_5$ and 246 p.p.m. iron, or 450 p.p.m. on a 75% $H_3PO_4$ basis, was neutralized with soda ash to pH 4 and the precipitate removed by filtration after the addition of 0.3% filter-aid Celite. A test of this solution with excess hydrogen sulfide gas showed no iron removal at this pH. Air blowing removed the dissolved hydrogen sulfide.

Example 3 (Comparative)

Another portion of the partially purified wet-process phosphoric acid which was taken from the same starting material as the acid treated in Example 2, above, was further treated with soda ash at 60° C. to raise its pH to 6.1, and then treated with 0.3% added Celite filter-aid plus 0.3% activated charcoal. The clear filtrate contained 25% $P_2O_5$ and 85 p.p.m. iron, or 185 p.p.m. iron on a 75% $H_3PO_4$ basis. This solution had to be held above 50° C. in order to prevent crystallization of the sodium phosphate from solution. Treatment of a 165 ml. sample of the filtrate with 0.7 g. $Na_2S \cdot 3H_2O$ dissolved in a sealed 8 ounce bottle for 16 hours at 52° C. generated pressures from 1.2 atmospheres at the start to 0.2 atmosphere at the end of the treatment. The mixture was occasionally stirred by means of a magnetic stirrer. Celite filter-aid was added and the mixture was filtered hot. The resulting filtrate contained 24% $P_2O_5$ and 28 p.p.m. iron, or 63 p.p.m. on a 75% $H_3PO_4$ basis, an iron level above that produced by the method of this invention.

Example 4 (This Invention)

A sample of partially purified sodium phosphate from the same source as that used in Example 2 was adjusted to pH 6.7 with caustic at 60° C. and filtered to yield a solution containing 25% $P_2O_5$ and 71 p.p.m. iron, or 155 p.p.m. on a 75% $H_3PO_4$ basis. Treatment of 180 ml. of the filtrate for 3 hours at 51° C. with 0.3 gram sodium sulfide in a sealed system generated pressures of less than 10 p.s.i. The analysis of the sodium phosphate product indicated that the $P_2O_5$ value remained constant but the iron was reduced to 2 p.p.m. (25% $P_2O_5$ basis) or 4.4 p.p.m. (75% $H_3PO_4$ basis).

Example 5 (This Invention)

A sample of sodium phosphate derived from the partially purified phosphoric acid used in Example 2 was treated with soda ash to adjust the pH to 7. Before sulfiding it contained 24% $P_2O_5$ and 52 p.p.m. iron, or 120 p.p.m. on a 75% $H_3PO_4$ basis after hot-Celite filtration. Upon treatment of 115 ml. of this solution for 3 hours at 60° C. with 0.23 g. $NaS \cdot 3H_2O$ (as 20% solution in a 4 oz. sealed bottle), after filtration the iron level was lowered to 7 p.p.m. (24% $P_2O_5$ basis) or 15.8 p.p.m. (75% $H_3PO_4$ basis).

Example 6 (This Invention)

Example 5 was repeated except that the starting solution was aged at pH 7 for 6 days at 60° C. and filtered three times. Before sulfiding it contained 24% $P_2O_5$ and 40 p.p.m. of iron. After 3 hours sulfiding at 60° C. (as in Example 4) and filtering, the iron level was lowered to 6 p.p.m. (24% $P_2O_5$ basis) or 13.5 p.p.m. (75% $H_3PO_4$ basis).

Example 7 (This Invention)

A sample of sodium phosphate derived from the partially purified phosphoric acid from the same source as that used in Example 2 was treated with sodium hydroxide until pH 8 was reached. After hot-Celite filtration the alkali phosphate contained 16 p.p.m. of iron at 24% $P_2O_5$. After sulfide treatment (as in Example 4) and filtration the iron level was 6 p.p.m. (24% $P_2O_5$ basis) or 13.5 p.p.m. (75% $H_3PO_4$ basis).

Another portion was treated with sodium hydroxide and adjusted to pH 9. After sulfiding (as in Example 4) the iron level was reduced to 4 p.p.m. iron (24% $P_2O_5$ basis) or 9.4 p.p.m. (75% $H_3PO_4$ basis).

TABLE

| Example | pH | $P_2O_5$ values (percent) | Iron concentration (p.p.m.), 75% $H_3PO_4$ basis | |
|---|---|---|---|---|
| | | | Before sulfide treatment | After sulfide treatment |
| 1 (comparative) | 5 | 14.6 | 171 | 97 |
| 2 (comparative) | 4 | 29.6 | 450 | 450 |
| 3 (comparative) | 6.1 | 25 | 185 | 63 |
| 4 | 6.7 | 25 | 155 | 4.4 |
| 5 | 7 | 24 | 120 | 15.8 |
| 6 | 7 | 24 | 90 | 13.5 |
| 7 | 8 | 24 | 36 | 13.5 |
| 7 | 9 | 24 | 36 | 9.4 |

It will be noted in referring to the table that the choice of pH has a marked effect on the removal of iron contaminants during the sulfide treatment. Most significant are the low iron values provided when the pH is 6.5 or higher.

Pursuant to the requirements of the patent statutes, the principle of this invention has been explained and exemplified in a manner so that it can be readily practiced by those skilled in the art, such exemplification including what is considered to be the best embodiment of the invention. However, it should be clearly understood, that within the scope of the appended claims, the invention may be practiced by those skilled in the art and having the benefit of this disclosure, otherwise than as specifically described and exemplified herein.

What is claimed is:

1. In the process of purifying an aqueous alkali phosphate solution produced by reacting alkali compounds with wet-process phosphoric acid and wherein said process includes a partial purification step to reduce the iron content of the alkali phosphate solution to below 10,000 p.p.m. on a 75% $H_3PO_4$ basis, the improvement which comprises further treating said aqueous alkali phosphate solution containing less than 10,000 p.p.m. of iron on a 75% $H_3PO_4$ basis with a sulfide reactant selected from the group consisting of an alkali sulfide and hydrogen sulfide in at least a stoichiometric amount of said sulfide based upon the amount of iron to be removed at a pH between 6.5 to 9 to form insolubles, and removing said insolubles to substantially decrease the content of iron in said aqueous alkali phosphate solution to below 50 p.p.m. on a 75% $H_3PO_4$ basis.

2. The process of claim 1 wherein the aqueous alkali phosphate solution contains less than 1,000 p.p.m. of iron before it is contacted with the hydrogen sulfide or alkali sulfide.

3. The process of claim 1 wherein the sulfide reactant is sodium sulfide.

4. The process of claim 1 wherein the sulfide reactant is hydrogen sulfide.

5. The process of claim 1 wherein the sulfide reactant is barium sulfide.

6. The process of claim 1 wherein the sulfide reactant is potassium sulfide.

7. The process of claim 1 wherein the sulfide reactant is ammonium sulfide.

8. In a process of purifying an aqueous alkali phosphate solution produced by reacting alkali compounds with wet-process phosphoric acid and wherein said process includes a partial purification step to reduce the iron content of the alkali phosphate solution to below 10,000 p.p.m. on a 75% $H_3PO_4$ basis, the improvement which comprises pretreating said aqueous alkali phosphate solution containing less than 10,000 p.p.m. of iron with activated charcoal followed by treatment of the charcoal free solution with a sulfide reactant selected from the group consisting of an alkali sulfide and hydrogen sulfide in at least a stoichiometric amount of said sulfide based upon the amount of iron to be removed at a pH between 6.5 to 9 to form insolubles, and removing said insolubles to substantially decrease the content of iron in said aqueous alkali phosphate solution to below 50 p.p.m. on a 75% $H_3PO_4$ basis.

9. The process of claim 8 wherein the aqueous alkali phosphate solution contains 50 to 1,000 p.p.m. of iron.

References Cited

UNITED STATES PATENTS

| 2,162,657 | 6/1939 | Wehrstein | 23—107 |
| 2,174,158 | 9/1939 | Kepfer et al. | 23—107 |
| 3,081,151 | 3/1963 | Marty | 23—107 |

OSCAR R. VERTIZ, Primary Examiner

C. B. RODMAN, Assistant Examiner